(12) United States Patent
Etram et al.

(10) Patent No.: US 9,813,537 B2
(45) Date of Patent: Nov. 7, 2017

(54) METHOD FOR CONNECTING AND BLOCKING CALL IN PORTABLE TERMINAL

(75) Inventors: Premkumar Etram, Suwon-si (KR); Kumarbrata Das, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 606 days.

(21) Appl. No.: 12/802,868

(22) Filed: Jun. 16, 2010

(65) Prior Publication Data
US 2010/0323673 A1 Dec. 23, 2010

(30) Foreign Application Priority Data
Jun. 17, 2009 (KR) .......................... 10-2009-0053943

(51) Int. Cl.
*H04M 3/42* (2006.01)
*H04M 1/663* (2006.01)

(52) U.S. Cl.
CPC .................................. *H04M 1/663* (2013.01)

(58) Field of Classification Search
CPC .................................................... H04M 1/663
USPC .................... 455/410–417; 379/88.01–88.28, 379/208.01–218.02, 265.01–266.1
See application file for complete search history.

(56) References Cited

U.S. PATENT DOCUMENTS 5,060,255 A * 10/1991 Brown .......................... 379/88.22
5,467,388 A * 11/1995 Redd et al. ............... 379/210.02
2004/0008833 A1 1/2004 Harada
2004/0062383 A1 * 4/2004 Sylvain .................... 379/265.06
2005/0020249 A1 1/2005 Seo
2006/0210024 A1 * 9/2006 Qiu ............................. 379/88.01
2007/0015496 A1 1/2007 Yoon et al.
2008/0098328 A1 * 4/2008 Rollin et al. .................. 715/810
2008/0139167 A1 * 6/2008 Burgess ..................... 455/404.1
2009/0172701 A1 * 7/2009 Gamaley et al. .............. 719/318
2010/0216438 A1 * 8/2010 Ruttler et al. ............. 455/414.1
2011/0113084 A1 * 5/2011 Ramnani ....................... 709/201

FOREIGN PATENT DOCUMENTS

JP          2004048310           2/2004
KR       20010090042 A          10/2001
KR         20060058758           5/2006

OTHER PUBLICATIONS

Korean Decision of Patent dated Jun. 21, 2016 in connection with Korean Patent Application 10-2009-0053943; 4 pages.
Korean Office Action dated Jun. 1, 2015 in connection with Korean Patent Application 10-2009-0053943; 8 pages.

* cited by examiner

Primary Examiner — Kashif Siddiqui

(57) ABSTRACT

A method in a call system connects and blocks a call in a portable terminal. A call blocking time period is set. An elapsed time period is measured from a time point when the call blocking time period is set. A determination is made as to whether the measured time period exceeds the set call blocking time period if the portable terminal receives a call connection request from an external terminal. If the measured time period does not exceed the set call blocking time period, the call connection is blocked and information regarding time period, calculated by subtracting the measured time period from the set call blocking time period, is transmitted to the external terminal that requested the call connection.

14 Claims, 9 Drawing Sheets

METHOD FOR CONNECTING AND BLOCKING CALL IN PORTABLE TERMINAL

CROSS-REFERENCE TO RELATED APPLICATION(S) AND CLAIM OF PRIORITY

The present application is related to and claims priority to and the benefit of Korean Patent Application No. 10-2009-0053943 filed in the Korean Intellectual Property Office on Jun. 17, 2009, the entire contents of which are incorporated herein by reference.

TECHNICAL FIELD OF THE INVENTION

The present invention relates to call system in portable terminals, and more particularly, to a call connecting and blocking method that transmits user state information regarding a called portable terminal receiving a request of a call connection request to a calling portable terminal requesting the call connection, thereby providing user convenience to portable terminal users.

BACKGROUND OF THE INVENTION

In recent years, portable terminals have been widely used because they can be easily carried and provide a variety of functions, including a voice call function. Portable terminals now serve as multimedia communication devices as they can provide, among others, a service for transmitting a variety of data.

Portable terminals have a call blocking function. If a portable terminal user is placed in a situation that he/she cannot or does not want to answer a call, for example, sleeping, meeting, driving, and such, he/she can execute a call blocking function to block an incoming call. If a portable terminal is set to block an incoming call, it generally transmits a voice message to a caller if the caller makes a call to the portable terminal.

In that situation, as long as the portable terminal user does not release the call blocking function on his/her portable terminal, the caller cannot make a call with the user. Therefore, the caller needs to repeatedly call the user until the user releases the call blocking function on his/her portable terminal. In addition, the portable terminal user may be placed in a situation where he/she allows the portable terminal to connect with certain calls and to block the remaining calls. Alternatively, the caller may be placed in an emergency situation where the caller must call a called party whose portable terminal is set in a call blocking function. However, conventional call blocking methods have not reflected these situations regarding the portable terminals.

SUMMARY OF THE INVENTION

To address the above-discussed deficiencies of the prior art, it is a primary object to provide a call connecting and blocking method that can provide a call blocking time period or user state information regarding a portable terminal, set in a call blocking function, to other portable terminal users (i.e. callers), thereby controlling the call connection between the portable terminal user and other users (callers).

The present invention further provides a call connection and blocking method that allows a portable terminal to control a call connection.

The present invention further provides a method for providing user state information regarding a portable terminal, set in a call blocking or connecting state, to other users.

In accordance with an embodiment of the present invention, the present invention provides a method for connecting and blocking a call in a portable terminal. A call blocking time period is set. An elapsed time period from a time point when the call blocking time period is set is measured. It is determined as to whether the measured time period exceeds the set call blocking time period if the portable terminal receives a call connection request from an external terminal. If the measured time period does not exceed the set call blocking time period, the call connection is blocked, and information regarding time period, calculated by subtracting the measured time period from the set call blocking time period, is transmitted to the external terminal that requested the call connection.

In accordance with another embodiment of the present invention, the present invention provides a method for connecting and blocking a call in a portable terminal. If the portable terminal set in a call blocking function receives a call connection request from at least one external terminal, the call connection is blocked. The phone number of at least one external terminal that requested the call connection is stored. If the portable terminal receives a command for releasing the call blocking function, a message stating that a call can be connected is transmitted to at least one external terminal.

In accordance with yet another embodiment of the present invention, the present invention provides a method for connecting and blocking a call in a portable terminal. If the portable terminal receives a call connection request from an external terminal, the call connection is blocked. A message to select whether to proceed with the call connection with the portable terminal is transmitted to the external terminal. If the portable terminal receives the next call connection request from the external terminal, a call connection with the external terminal is performed.

In accordance with another embodiment of the present invention, the present invention provides a method for connecting and blocking a call between first and second portable terminals. The first portable terminal sets user state information. If the first portable terminal receives a call connection request from the second portable terminal, a call connection from the second portable terminal is blocked. The first portable terminal transmits a message to the second portable terminal, where the message contains the set user state information and asks the user of the second portable terminal to determine whether he/she makes a call to the first portable terminal. The second portable terminal performs a call connection with the first portable terminal or transmits information regarding the second portable terminal to the first portable terminal.

In accordance with another embodiment of the present invention, the present invention provides a method for providing user state information between first and second portable terminals. The second portable terminal is informed that the first portable terminal will store the phone number of the second portable terminal in an update list of user state information. The first portable terminal is informed that the second portable terminal has stored the phone number of the first portable terminal in an update list of user state information. The phone number of the second portable terminal is stored in the update list of user state information in the first terminal. If the second portable terminal receives a command for altering user state information, information regarding the altered user state information is transmitted from the second portable terminal to the first portable terminal. The user state information regarding the second portable terminal is updated, based on the altered user state information received by the first portable terminal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged call system.

Figure 1:
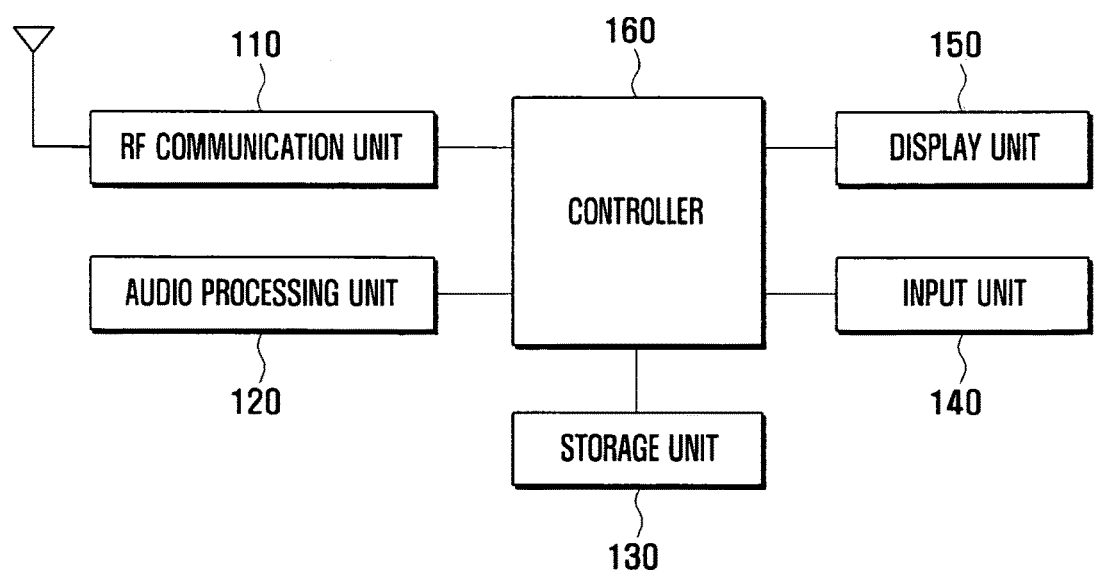
FIG. 1 illustrates a portable terminal according to an embodiment of the present invention.

FIG. 1 illustrates a portable terminal according to an embodiment of the present invention. The portable terminal shown in FIG. 1 includes various types of terminals and may be distinguished as a first or second portable terminal, for the sake of convenience in the following description. For example, the first portable terminal refers to a portable terminal that receives a call connection request and the second portable terminal refers to a portable terminal that transmits a call connection request. Each portable terminal includes an RF communication unit 110, an audio processing unit 120, a storage unit 130, an input unit 140, a display unit 150, and a controller 160.

The RF communication unit 110 serves to wirelessly transmit and receive data to and from other communication systems. The RF communication unit 110 includes an RF transmitter for up-converting the frequency of signals to be transmitted and amplifying the signals and an RF receiver for low-noise amplifying received RF signals and down-converting the frequency of the received RF signals. The RF communication unit 110 receives data via an RF channel and outputs it to the controller 160. The RF communication unit 110 also transmits data, output from the controller 160, via the RF channel. The RF communication unit 110 performs RF communication with at least one external portable terminal via a base transceiver station (BTS), a base station controller (BSC), a mobile switching center (MSC), and so forth The audio processing unit 120 includes coder-decoders (CODECs). The CODECs are comprised of a data CODEC for processing packet data and an audio CODEC for processing audio signals, such as voice signals. The audio CODEC converts digital audio signals into analog audio signals and outputs them via a speaker (SPK). The audio CODEC also converts analog audio signals received by a microphone MIC into digital audio signals.

The storage unit 130 serves to store programs that are required to operate the portable terminal and data generated when the programs are executed. The storage unit 130 is comprised of a program storage area and a data storage area. In an embodiment of the present invention, the storage unit 130 is implemented with volatile storage media or non-volatile storage media or a combination thereof. The volatile storage media includes semiconductor memory, such as RAM, DRAM, SRAM, and such. The non-volatile storage media includes a hard disk. In a first embodiment of the method for connecting and blocking a call, the storage unit 130 stores a call connection blocking time period set by a user. In a third embodiment of the method for connecting and blocking a call and an embodiment of the method for providing user state information, the storage unit 130 stores the user state information set by a user.

The input unit 140 receives key signals for controlling the portable terminal, operated by a user, and outputs them to the controller 160. The input unit 140 may be implemented with a keypad with alphanumeric keys and direction keys. The input unit 140 may also be a touch pad if the portable terminal is equipped with a touch screen. If the portable terminal is equipped with an image sensor, an acceleration sensor, and such, they may also serve as the input unit 140. In a first embodiment of a method for connecting and blocking a call, a user sets a call blocking mode with an execution mode and then sets a call connection blocking time period, via the input unit 140. Likewise, in a second embodiment of a method for connecting and blocking a call, the user sets a call blocking mode with an execution mode or a release mode, via the input unit 140. In a third embodiment of a method for connecting and blocking a call, the user can also set a call blocking mode with one selected from among an execution mode, a release mode, and a selection mode. The user can set user state information via the input unit 140. In a method for providing user state information according to an embodiment of the present invention, a user of the first portable terminal inputs a command for storing information regarding the second portable terminal in an update list of user information in the first portable terminal, via the input unit 140 of the first portable terminal. Likewise, a user of the second portable terminal inputs a command for storing information regarding the first portable terminal in an update list of user information in the second portable terminal, via the input unit 140 of the second portable terminal. In addition, the user of the second portable terminal can also input a command for altering user state information via the input unit 140 of the second portable terminal.

The display unit 150 is implemented with a liquid crystal display (LCD). The display unit 150 displays menus, input data, function-setting information, and addition information. For example, the display unit 150 displays a booting screen, an idle screen, a displaying screen, a call screen, and application executing screens of the portable terminal. In a first embodiment of a method for connecting and blocking a call, the first portable terminal controls its display unit 150 to display screens for setting a call blocking mode or a call connection blocking time period. The second portable terminal controls its display unit 150 to display information regarding a call blocking remaining time period of the first portable terminal, transmitted from the first portable terminal. In a second embodiment of a method for connecting and blocking a call, the second portable terminal controls its display unit 150 to display a call connection informing message of the first portable terminal, transmitted from the first portable terminal. In a third embodiment of a method for connecting and blocking a call, the first portable terminal controls its display unit 150 to display screens for setting a call blocking mode and user state information. The second portable terminal controls its display unit 150 to display user state information, transmitted from the first portable terminal, and a message to select whether to proceed with a call connection. In a method for providing user state information according to an embodiment of the present invention, the first and second portable terminals display menu screens for setting their update list of user state information on their display units 150, respectively. The portable terminals display messages transmitted from each terminal on their display unit 150, respectively. The second portable terminal controls its display unit 150 to display a menu screen for altering user state information. The first portable terminal receives the altered user state information from the second portable terminal, updates the list of user state information regarding the second portable terminal, and displays it on the display unit 150.

The controller 160 controls the entire operation of the portable terminal and signal flows among the elements in the portable terminal. In a first embodiment of a method for connecting and blocking a call, the controller 160 of the first portable terminal sets a call connection blocking time period and measures an elapsed time period from the set time point. The controller 160 of the first portable terminal controls the RF communication unit 110 to determine whether the first portable terminal receives a call connection request from the second portable terminal. If the controller 160 of the first portable terminal ascertains that the first portable terminal has received a call connection request from the second portable terminal, it compares the measured time period with the preset call connection blocking time period. If the controller 160 of the first portable terminal concludes that the measured time period has exceeded the preset call connection blocking time period, it controls the RF communication unit 110 to establish a call connection with the second portable terminal. On the contrary, if the measured time period has not exceeded the preset call connection blocking time period, the controller 160 controls the RF communication unit 110 to transmit a remaining time period to the second portable terminal.

In a second embodiment of a method and blocking a call, the controller 160 of the first portable terminal receives a user command via the input unit 140 and sets the call blocking mode in an executing mode. If the controller 160 of the first portable terminal receives a call connection request from the second portable terminal, it controls the RF communication unit 110 to transmit a call blocking message to the second portable terminal. Likewise, the controller 160 of the first portable terminal receives a user command via the input unit 140 and sets the call blocking mode in a release mode. After that, the controller 160 of the first portable terminal controls the RF communication unit 110 to transmit a call connectable message to the second portable terminal.

In a third embodiment of a method and blocking a call, the controller 160 of the first portable terminal receives a user command via the input unit 140 and sets user state information. The controller 160 of the first portable terminal controls the RF communication unit 110 to transmit a message to select whether to proceed with a call connection, the message containing the set user state information, to the second portable terminal. The controller 160 of the second portable terminal controls the display unit 150 to display the user state information regarding the first portable terminal and the received message. The controller 160 of the second portable terminal controls the input unit 140 to determine whether to input a call connection key or a call termination key. After that, the controller 160 of the second portable terminal controls the RF communication unit 110 to perform a call connection or a call termination with the first portable terminal, according to the user command input via the input unit 140.

In a method for providing user state information according to an embodiment of the present invention, the first portable terminal transmits a message to the second portable terminal, showing that information regarding the second portable terminal will be stored in the update list of user state information of the first portable terminal. The second portable terminal transmits a message to the first portable terminal, showing that information regarding the first portable terminal has been stored in the update list of user state information of the second portable terminal. The second portable terminal receives an input signal corresponding to a command for changing user state information and transmits the changed user state information to the first portable terminal. The first portable terminal displays the updated user state information regarding the second portable terminal.

Figure 2:
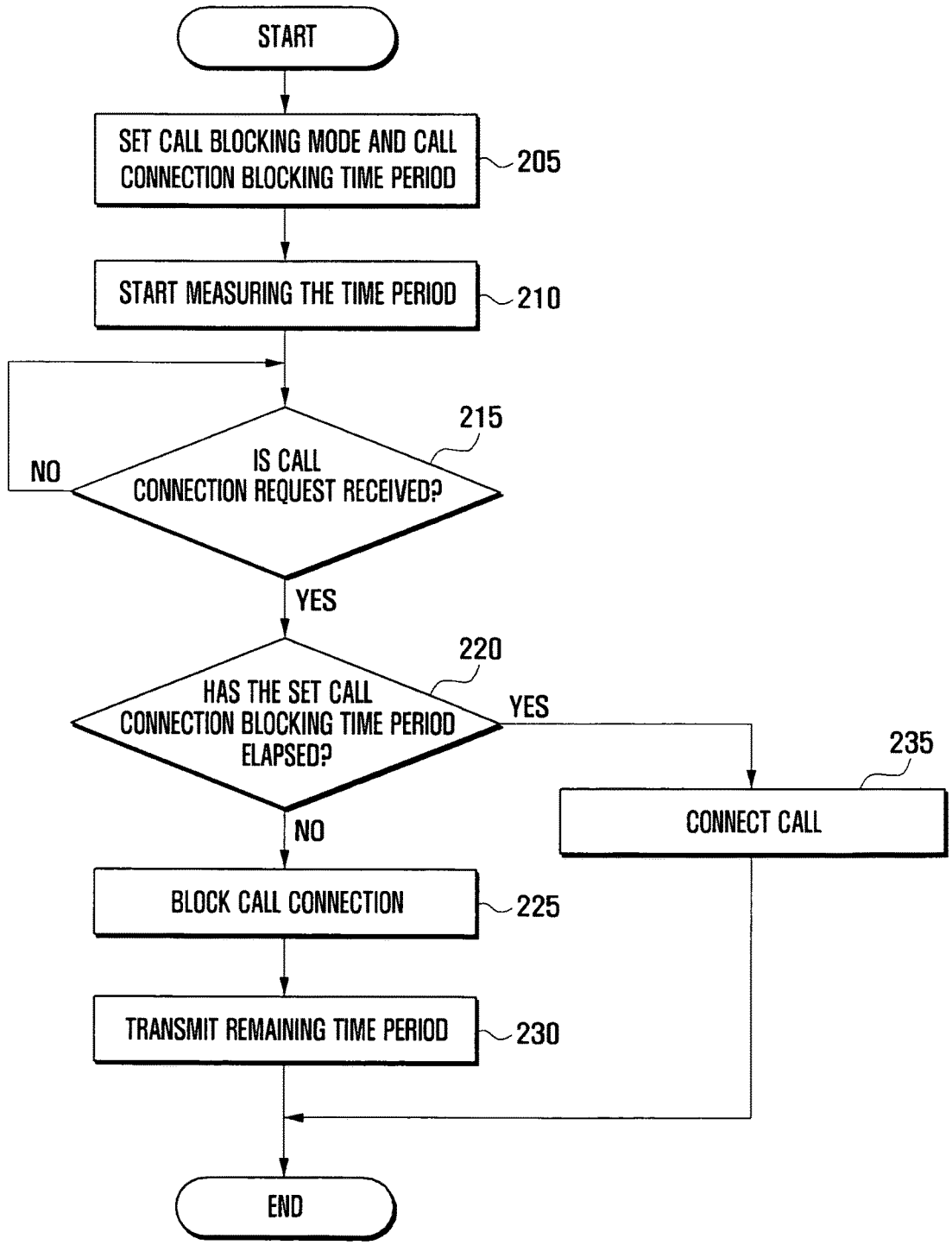
FIG. 2 illustrates a flow chart of a first embodiment of a method for connecting and blocking a call in a first portable terminal, according to the present invention.

FIG. 2 illustrates a flow chart of a first embodiment of a method for connecting and blocking a call in a first portable terminal, according to the present invention.

In block 205, the first portable terminal displays menus for setting a call blocking mode and a call connection blocking time period. The menu for setting a call blocking mode is comprised of an executing mode and a releasing mode, one of which is selected. The menu for setting a call connection blocking time period may be implemented to input a time period. For example, the menu can be configured to set a time period to block a call connection (e.g. thirty minutes, one hour, two hours, and so forth), or specify a time to release a call blocking function (e.g. 2:40 p.m.). If the call connection blocking time period is set according to a time period, the menu may show regular time periods, such as fifteen minutes, thirty minutes, one hour, and so forth, such that one of the time periods can be selected. The menu for setting a call connection blocking time period can also be implemented to allow a user to directly input a time period (for example, 2 hours 13 minutes). The menu for setting a call connection blocking time period may be contained in the menu for setting a call blocking mode or separated from the menu for setting a call blocking mode. For example, if an execution mode has been selected in the menu for setting a call blocking mode, the controller 160 of the first portable terminal controls the display unit 150 to display the menu for setting a call connection blocking time period as a menu associated with the menu for setting a call blocking mode. The controller 160 receives a user input signal via the input unit 140, sets a call blocking mode and a call connection blocking time period, and then stores them in the storage unit 130.

In block 210, the first portable terminal starts to measure the elapsed time immediately after setting a call connection blocking time period. If the first portable terminal has a function to temporarily cease measuring the elapsed time, the first portable terminal determines whether a user inputs a command that ceases to measure an elapsed time. If the first portable terminal ascertains that the user has input a command for resuming the measurement of an elapsed time in a state where the process of measuring the elapsed time has ceased, it resumes measuring the elapsed time from the time point that the process of measuring the elapsed time ceased.

In block 215, the first portable terminal determines whether to receive a call connection request from an external terminal (for example, the second portable terminal). If a call connection request from an external terminal has been received at block 215, the first portable terminal checks the set call blocking mode and the call connection blocking time period and then determines whether the measured time period has exceeded the call connection blocking time period in block 220. In addition, if the first portable terminal ceases measuring the elapsed time according to a user's input command, it determines whether the elapsed time period excluding the ceased time period has exceeded the set call connection blocking time period.

If the first portable terminal ascertains that the measured time period has not exceeded the call connection blocking time period at block 220, it blocks a call connection from the external terminal at block 225. In block 230, the first portable terminal identifies a remaining time period that is calculated by subtracting the measured time period from the set call connection blocking time period and then transmits the identified remaining time period to the second portable terminal via the RF communication unit 110. In addition, if the user of the first portable terminal sets the call connection blocking to a specific time, the first portable terminal may transmit the specific time that a call connection blocking will be released to the second portable terminal via the RF communication unit 110.

Alternatively, if the first portable terminal ascertains that the measured time period has exceeded the call connection blocking time period at block 220, it performs a call connection with the second portable terminal via the RF communication unit 110 in block 235.

Figure 3:
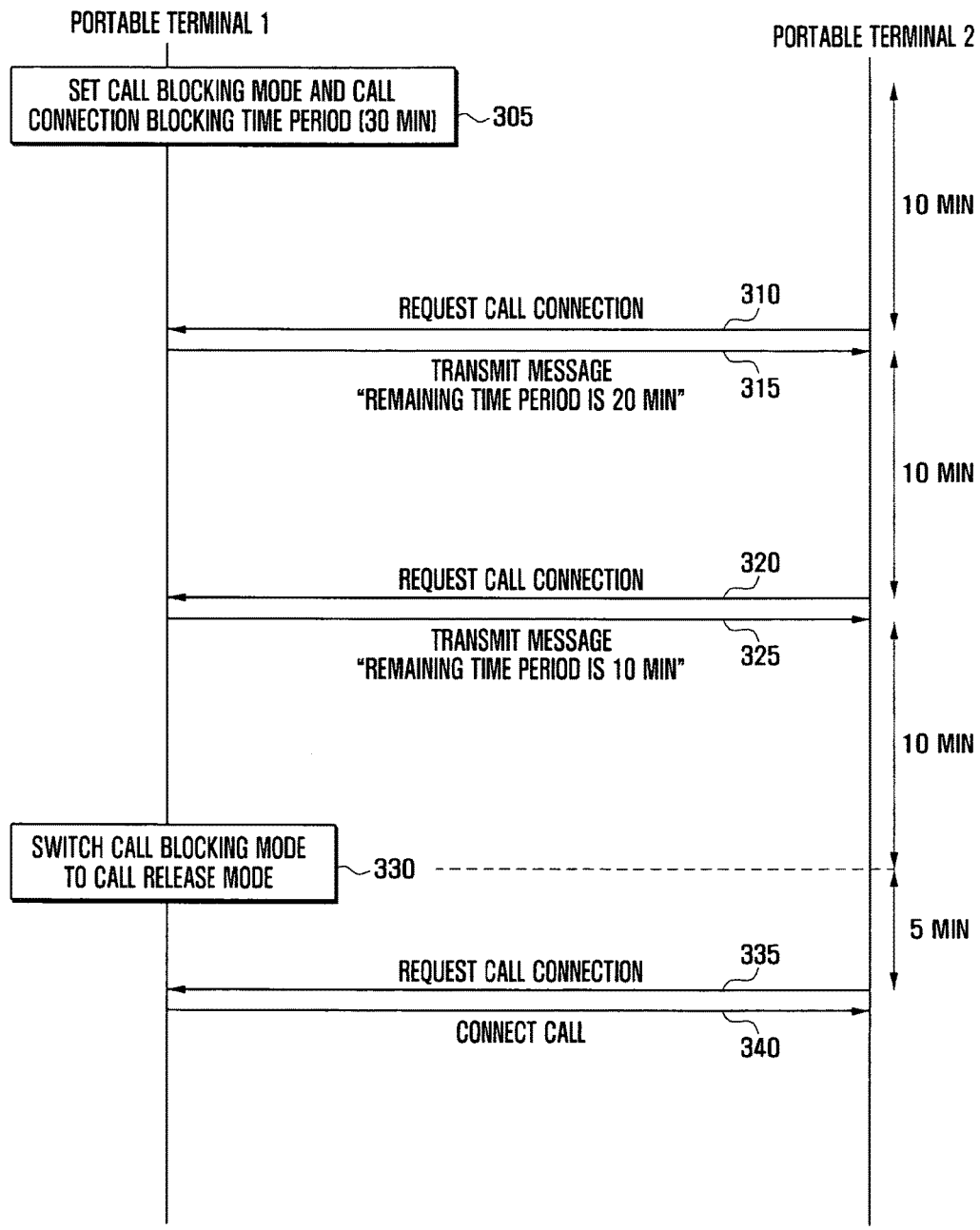
FIG. 3 illustrates a signal flow chart of the first embodiment of a method for connecting and blocking a call between a first and a second portable terminals, according to the present invention.

FIG. 3 is a signal flow chart that describes a first embodiment of a method for connecting and blocking a call between the first and second portable terminals, according to the present invention.

In block 305, the first portable terminal sets a call blocking mode in an execution mode according to a user's input and the call connection blocking time period to thirty minutes. After setting the call connection blocking time period at block 305, the first portable terminal starts to measure an elapsed time. When the second portable terminal transmits a call connection request message 310 to the first portable terminal, the first portable terminal receives the call connection request message 310 from the second portable terminal. After that, the first portable terminal identifies that the call blocking mode has been set in an execution mode and the call connection blocking time period has been set to thirty minutes, and then determines whether a measured time period has exceeded the set call connection blocking time period. If the first portable terminal ascertains that the measured time period, for example, ten minutes, has not exceeded the set call connection blocking time period, it transmits a remaining time period message 315 containing a remaining time period, for example, twenty minutes, to the second portable. In an embodiment of the present invention, the message may be a short messaging service (SMS) message. Alternatively, the first portable terminal may also transmit a voice message to the second portable terminal.

If the second portable terminal sends another call connection request message 320 to the first portable terminal, the first portable terminal receives the call connection request 320 from the second portable terminal and then identifies that the measured time period is twenty minutes. The first portable terminal transmits another remaining time period message 325 stating the remaining time period, for example, ten minutes, to the second portable terminal.

If the first portable terminal continues to measure an elapsed time period and ascertains that the measured time period exceeds the thirty-minute call connection blocking time period, it switches the call blocking mode to a call release mode in block 330. In an embodiment of the present invention, after switching the call blocking mode to a call release mode at block 330, the first portable terminal may further transmit a message to the second portable terminal stating that the call blocking mode has been released.

When the second portable terminal sends the call connection request message 335 to the first portable terminal after the first portable terminal has switched to the call release mode, the first portable terminal performs a call connection with the second portable terminal by sending the call connection message 340.

As described above, in the first embodiment of a method for connecting and blocking a call, the user of the first portable terminal sets a call connection blocking time period and provides it to the user of the second portable terminal, such that the user of the second portable terminal can recognize a call connectable time point with the user of the first portable terminal.

Figure 4:
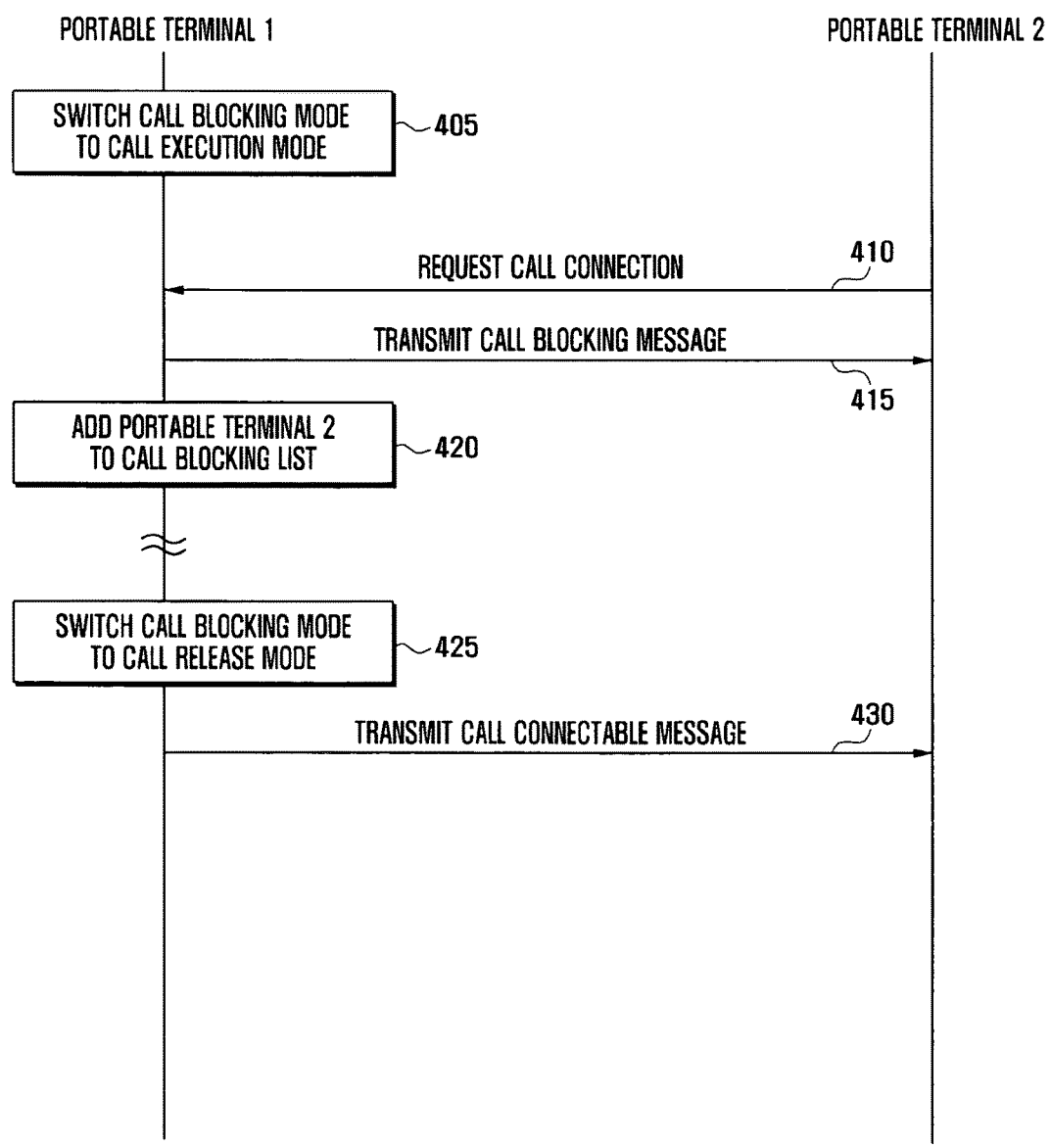
FIG. 4 illustrates a signal flow chart of a second embodiment of a method for connecting and blocking a call between the first and second portable terminals, according to the present invention.

FIG. 4 illustrates a signal flow chart of a second embodiment of a method for connecting and blocking a call between the first and second portable terminals, according to the present invention.

The first portable terminal determines whether a user inputs a command for setting a call blocking mode with an execution mode in block 405. The controller 160 of the first portable terminal controls the display unit 150 to display a menu screen for setting a call blocking mode. When the user inputs a command for setting a call blocking mode to an execution mode, via the input unit 140, the first portable terminal sets the call calling mode in an execution mode.

The second portable terminal transmits a call connection request 410 to the first portable terminal. The first portable terminal receives the call connection request 410 from the second portable terminal. After checking the set call blocking mode, the first portable terminal blocks the call connection. After that, the first portable terminal transmits a call blocking message 415 to the second portable terminal stating that the call is blocked. In an embodiment of the present invention, the message may be a short messaging service (SMS) message. Alternatively, the first portable terminal may also transmit a voice message to the second portable terminal.

In block 420, the first portable terminal adds the number of the second portable terminal to the list of call blocking numbers and then stores it. In an embodiment of a method for connecting and blocking a call, the list of call blocking numbers refers to a list containing at least one phone number of an external terminal (such as the second portable terminal) that requests a call connection from the first portable terminal. The list of call blocking numbers is stored in the storage unit 130. The first portable terminal stores the phone number of an external terminal that is requesting a call connection to the first portable terminal in the list of call blocking numbers each time that it receives a call connection request 410.

In block 425, the first portable terminal determines whether a user inputs a command for switching the call blocking mode from an execution mode to a release mode. If a user has input the command at block 425, the first portable terminal sets the call blocking mode to a release mode. After that, the first portable terminal transmits a call connectable message 430 to the second portable terminal stating that a call is now connectable.

As described above, in the second embodiment of a method for connecting and blocking a call, the user of the first portable terminal switches a call blocking mode from an execution mode to a release mode and then transmits a message to the second portable terminal stating that a call is connectable to the first portable terminal, such that the user of the second portable terminal can recognize when a call is connectable with the user of the first portable terminal.

Figure 5:
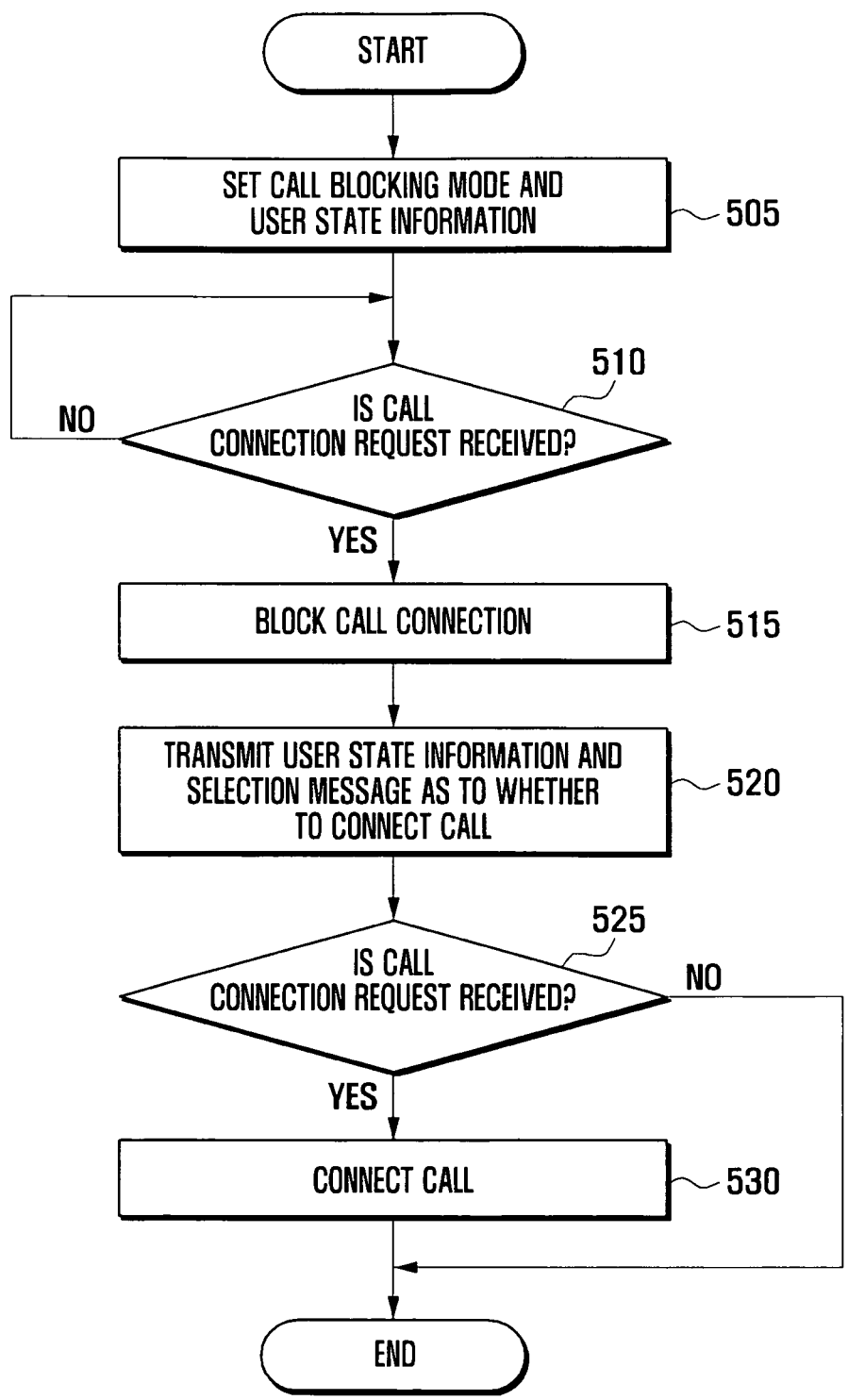
FIG. 5 illustrates a flow chart of a third embodiment of a method for connecting and blocking a call in the first portable terminal, according to the present invention.

FIG. 5 illustrates a flow chart of the second embodiment of a method for connecting and blocking a call in the first portable terminal, according to the present invention.

In block 505, the first portable terminal displays menus for setting a call blocking mode and a user state information. The menu for setting a call blocking mode is comprised of an executing mode, a releasing mode, and a selection mode—one of which is selected. The selection mode refers to a call blocking mode that is set in such a way that a call connection is temporarily blocked when the first portable terminal receives a call connection request from an external terminal, or a call connection is performed when the first portable terminal receives a subsequent call connection request from the same external terminal that has the same number.

The menu for setting user state information may be implemented to input a current state of a user. The user state information may be a list of situations in which a user cannot, or does not want to, answer his/her call, for example, 'meeting,' 'driving,' 'sleeping,' and so forth. The menu for setting the user state information may be implemented in such a way that some user state information, such as meeting or driving appears in the list such that one of them can be selected. Alternatively, the menu for setting user state information may also be implemented in such a way that the user can directly input user state information. In an embodiment of the present invention, the menu for setting user state information may be included in the menu for setting a call blocking mode or separated from the menu for setting a call blocking mode.

In block 510, the first portable terminal determines when a call connection request is received from an external terminal (for example, the second portable terminal). When the first portable terminal receives a call connection request from an external terminal at block 510, the first portable terminal checks a set call blocking mode and the user state information and then temporarily blocks a call connection at block 515. In an embodiment of the present invention, the first portable terminal can further store the phone number of the requesting external terminal in the storage unit 130. In block 520, the first portable terminal transmits a message to the external terminal requesting the call connection, the message containing user state information and a selection whether to proceed with a call connection).

In block 525, the first portable terminal determines whether a subsequent call connection request is received from the external terminal. In an embodiment of the present invention, the first portable terminal can also determine whether a call connection request is received from an external terminal whose phone number is stored in the storage unit 130 of the first portable terminal. If the first portable terminal has received a call connection request from an external terminal whose phone number is the same number as the external terminal that previously requested a call connection at block 510, the first portable terminal performs a call connection with the external terminal at block 530.

Figure 6:
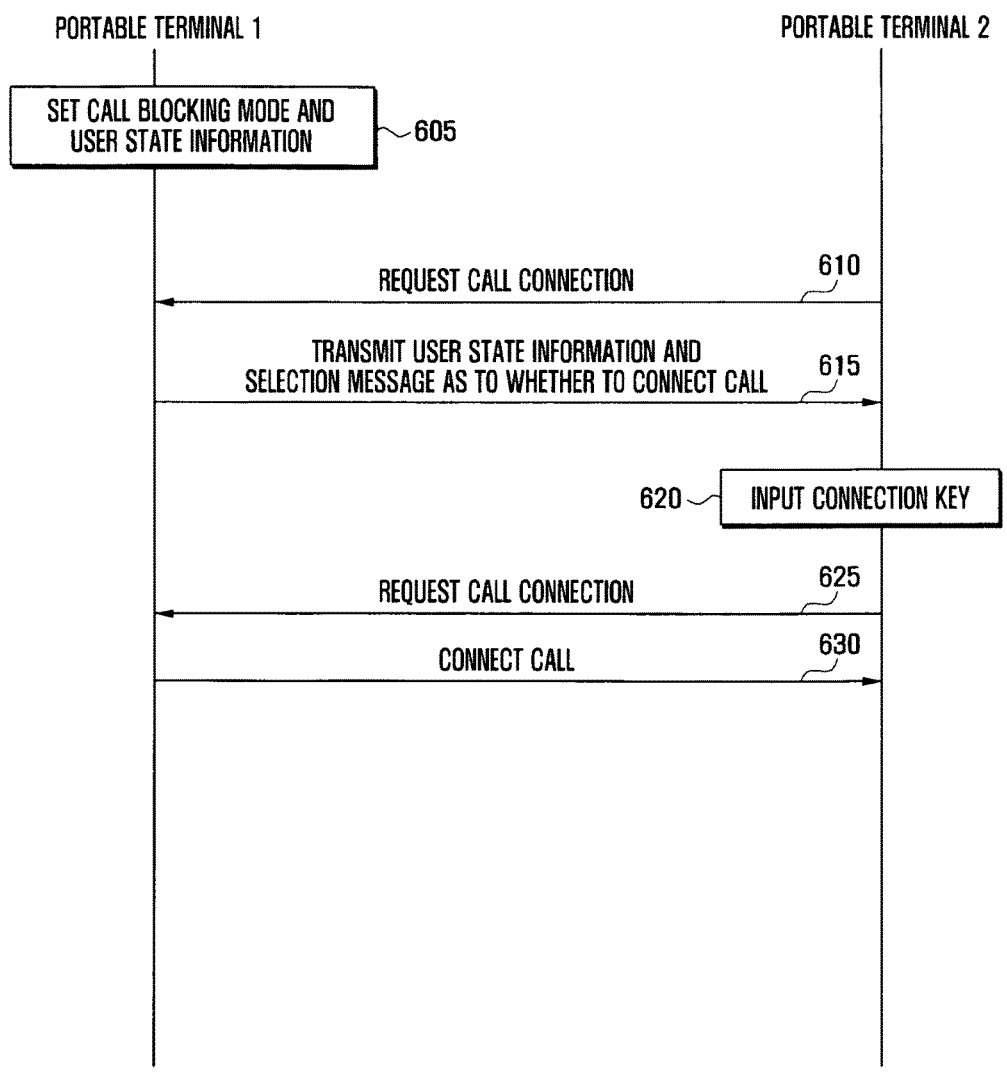
FIG. 6 illustrates a signal flow chart of the third embodiment of a method for connecting and blocking a call between the first and second portable terminals, according to the present invention.

FIG. 6 illustrates a signal flow chart of a third embodiment of a method for connecting and blocking a call between the first and second portable terminals, according to the present invention.

In block 605, the first portable terminal sets a call blocking mode and a menu for setting user state information. The call blocking mode is comprised of an execution mode, a release mode, and a selection mode. In the third embodiment, it is assumed that a user has selected the call blocking mode as a selection mode and has also selected 'in a meeting' as user state information. It is also assumed that the first portable terminal has set the call blocking mode as a selection mode, set user the state information as 'in a meeting,' according to a user's input command, and stored them in the storage unit 130.

The second portable terminal sends a call connection request 610 to the first portable terminal. The first portable terminal receives the call connection request 610 from the second portable terminal. The first portable terminal, upon determining that the call blocking mode has been set in a selection mode and the user state information has been set to 'in a meeting,' transmits a selection message 615 to the second portable terminal. The selection message 615 contains the user state information (in a meeting), and asks the user of the second portable terminal to select one from among a 'call connection,' a 'call termination,' and a 'message transmission'. The first portable terminal may create the selection message 615. If the first portable terminal transmits contents to be transmitted to the second portable terminal to a base station, the base station creates the selection message 615 containing the contents. If the selection message 615 is created in the first portable terminal, the first portable terminal waits for a reply from the second portable terminal. If the selection message 615 is created in the base station, after transmitting the message to the second portable terminal, the base station waits for a reply from the second portable terminal, and the first portable terminal waits for the reply from the base station.

Figure 8A:
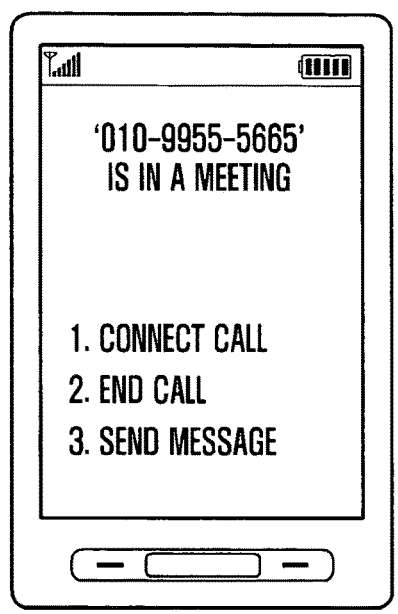
FIG. 8A illustrates a message that the second portable terminal receives and displays on a screen from the first portable terminal according to an embodiment of the present invention.

The second portable terminal receives the selection message 615 and displays it on the display unit 150 of the second portable terminal, where the message is shown in FIG. 8A. That is, FIG. 8A illustrates a message that the second portable terminal receives and displays on a screen according to the third embodiment of the method for connecting and blocking a call. As shown in FIG. 8A, the displayed message 615 contains user state information indicating that the user of the first portable terminal (having the number '010-9955-5665') is in a meeting. The displayed message 615 also provides key input guide information allowing the user of the second portable terminal to select one from among '1. Connect call,' '2. End call,' and '3. Send message.'

If the user of the second portable terminal selects key '1', the second portable terminal recognizes that key '1' has been input via the input unit 140 in block 620, and sends the call connection request 625 to the first portable terminal. The first portable terminal performs a call connection with the second portable terminal by sending the call connection message 630. In an embodiment of the present invention, if the user of the second portable terminal inputs key '1', the second portable terminal can also perform a call connection with the first portable terminal via the RF communication unit 110. In this embodiment, the first portable terminal transmits the call connection message to the second portable terminal and maintains a call connection standby state to be connected with the second portable terminal. In another embodiment of the present invention, the first portable terminal transmits the selection message 615 to the second portable terminal and then starts to measure an elapsed time period. While measuring the elapsed time period, if the first portable terminal receives a call connection request from the second portable terminal within a preset reference time period, it performs a call connection with the second portable terminal. If the first portable terminal receives a call connection request from the second portable terminal after the measured time period has exceeded the preset reference time period, it transmits another selection message 615 to the second portable terminal, containing user state information and prompting to select whether to proceed with a call connection.

Figure 8B:
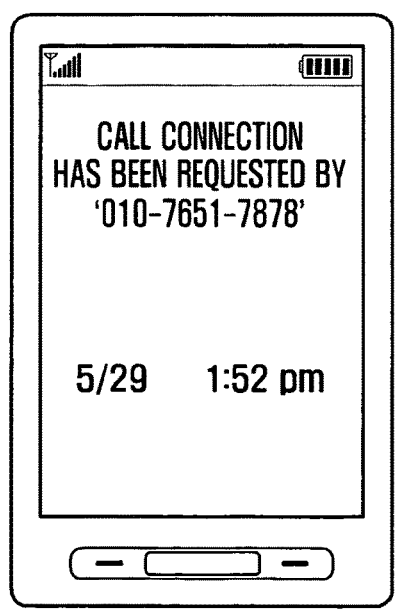
FIG. 8B illustrates a message that the first portable terminal receives and displays on a screen from the second portable terminal according to an embodiment of the present invention.

If the user of the second portable terminal inputs key '2', the second portable terminal terminates the call connection with the first portable terminal. Likewise, if the user of the second portable terminal inputs key '3', the second portable terminal transmits a message to the first portable terminal, where the message contains information regarding the phone number of the second portable terminal and information regarding a time at which a call connection has been attempted, as illustrated in FIG. 8B. That is, FIG. 8B illustrates a message that the first portable terminal receives and displays on a screen according to the third embodiment of the method for connecting and blocking a call. As shown on a display screen of FIG. 8B, the message indicates that a call connection has been requested by the second portable terminal (having the number '010-7651-7876') along with the time that the second portable terminal attempted a call connection, for example, May 29, 1:52 p.m.

As described above, in the third embodiment of a method for connecting and blocking a call, the first portable terminal receives a call connection request from the second portable terminal and transmits to the second portable terminal user state information and the selection message 615 to select whether to proceed with a call connection, such that the user of the second portable terminal can select whether to proceed with a call connection, and the user of the first portable terminal can answer an urgent phone call.

Figure 7:
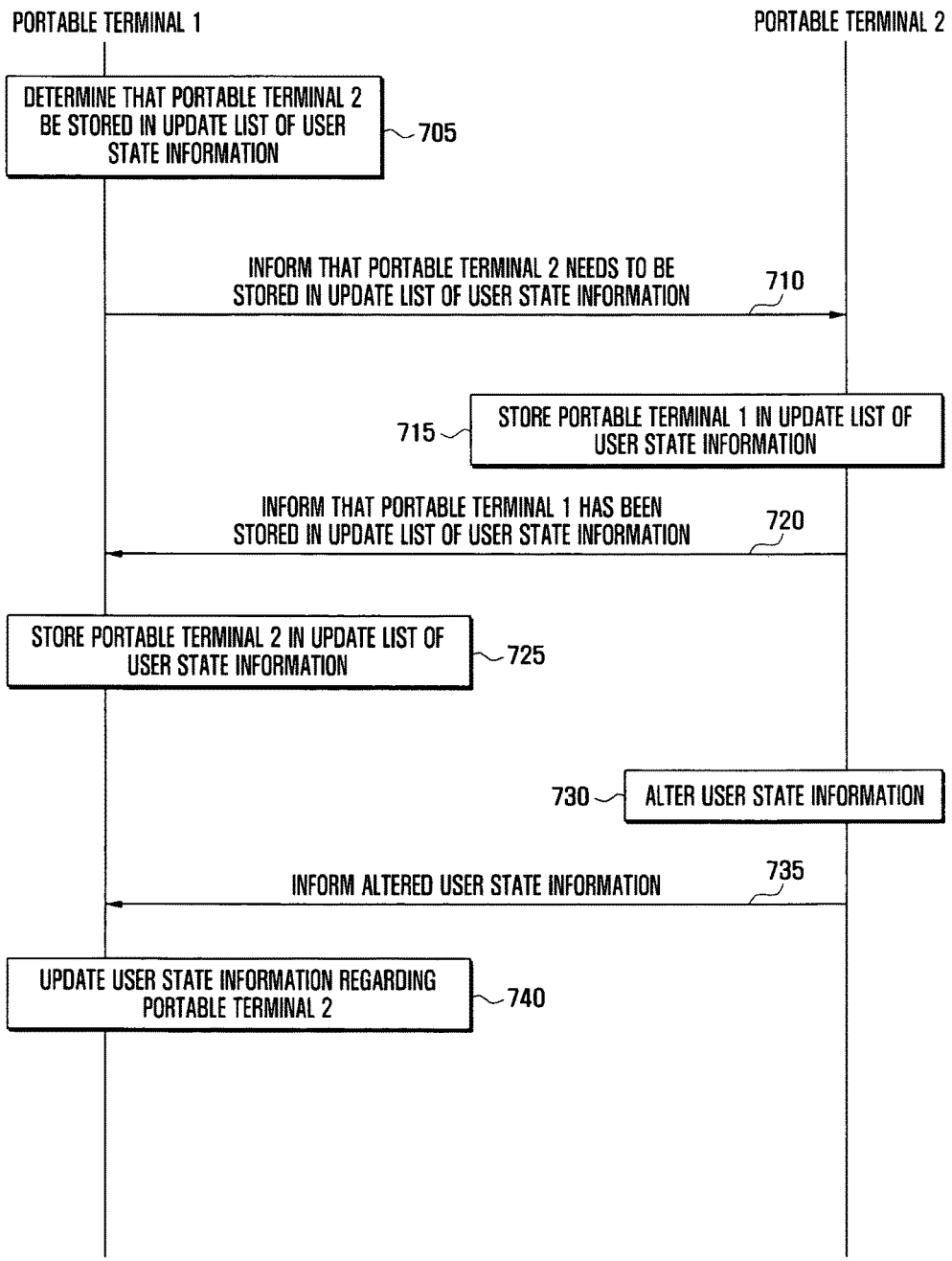
FIG. 7 illustrates a signal flow chart of a method for providing user state information between the first and second portable terminals, according to an embodiment of the present invention.

FIG. 7 illustrates a method for providing user state information between the first and second portable terminals, according to an embodiment of the present invention.

Figure 8C:
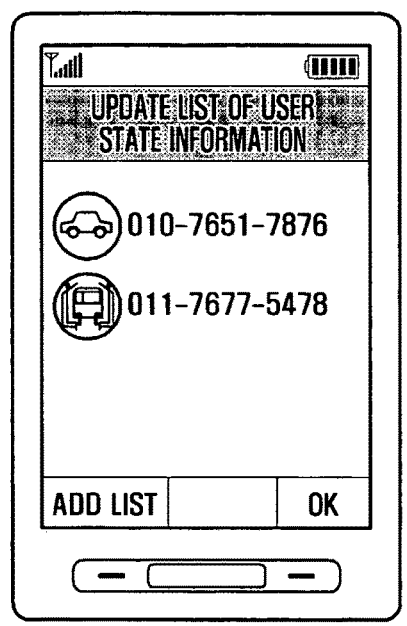
FIG. 8C illustrates a screen that displays an update menu of user state information while the method for providing user state information is being executed, according to an embodiment of the present invention.

When the user of the first portable terminal selects a menu for updating user state information, the first portable terminal displays the menu as shown in FIG. 8C. That is, FIG. 8C illustrates a screen that displays an update menu of user state information according to an embodiment of the present invention. As shown in FIG. 8C, the menu for updating user state information contains a list of currently registered phone numbers and icons corresponding to user state information. The menu may be implemented in such a way that it may further contain a list that can be maintained by the portable terminal. The icon next to '010-7766-7876' corresponds to the 'driving' user state, and the icon next to '010-7677-5478' corresponds to the 'meeting' user state. In an embodiment of the present invention, if user state information is classified into categories, these categories can be expressed by different colored icons. For example, if user state information is a state in which the user cannot answer a call, such as 'sleeping,' its icon is displayed in red. Likewise, if user state information is a state in which, although the user can answer a call, the user would rather not answer the call, its icon is expressed in yellow. In addition, the icon corresponding to a call blocking release state may be expressed in green.

Figure 8D:
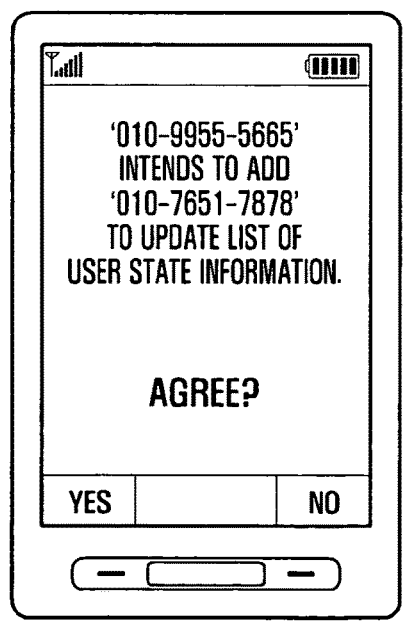
FIG. 8D illustrates a message that the second portable terminal receives and displays on a screen from the first portable terminal according to an embodiment of the present invention.

In block 705, if the user selects a 'list addition' key and enters the phone number of the second portable terminal in the list input field, the first portable terminal recognizes the input phone number. The first portable terminal transmits an update request message 710 to the second portable terminal, in which the update request message indicates that the first portable terminal intends to add the phone number of the second portable terminal to the update list of user state information, as shown in FIG. 8D. That is, FIG. 8D is a view illustrating the update request message 710 that the second portable terminal receives and displays on a screen, according to an embodiment of the present invention. As shown in FIG. 8D, the update request message 710 states that the first portable terminal (having the number '010-9955-5665') intends to add the second portable terminal (having the number '010-7651-7878') to the update list of user state information. The message also asks whether the user of the second portable terminal agrees with this request. In an embodiment of the present invention, the update request message 710 that the second portable terminal receives from the first portable terminal may be implemented to request the addition of the phone number of the first portable terminal to the update list of user state information in the second portable terminal.

When the user of the second portable terminal inputs a key confirming that the first portable terminal will add the second portable terminal to the update list of user state information or agrees with the request to add the first portable terminal to the update list of user state information in the second portable terminal, the second portable terminal stores the phone number of the first portable terminal in the update list of user state information in the second portable terminal in block 715. The second portable terminal transmits a confirmation message 720 to the first portable terminal, stating that the second portable terminal has stored the phone number of the first portable terminal in the update list of user state information. The first portable terminal receives the confirmation message 720 from the second portable terminal and adds the phone number of second portable terminal to the update list of user state information in block 725.

Subsequently, the user of the second portable terminal may alter user state information as shown in block 730. In an embodiment of the present invention, if the second portable terminal displays the menu for updating user state information on the display unit 150, the user of the second portable terminal can alter icons containing the menu for updating user state information, thereby inputting a command for altering the user state information.

The second portable terminal recognizes that the user state information has been altered and transmits the altered user state information 735 to the first portable terminal. The first portable terminal updates the user state information regarding the second portable terminal in the update list of user state information in block 740. In an embodiment of the present invention, the shapes and colors of the icons corresponding to user state information regarding the second portable terminal can be changed in the display unit 150 of the first portable terminal.

If the first portable terminal alters user state information, the altered user state information is automatically transmitted to the second portable terminal. Likewise, if the second portable terminal alters user state information, the altered user state information is automatically transmitted to the first portable terminal. Therefore, the portable terminal users can identify the state of users stored in the list, respectively, and the select whether make a call. In particular, the users can make a call to other users while reducing the difficulty in answering a call.

As described above, the call connecting and blocking method, according to the present invention, can allow a portable terminal user to receive a message containing a call blocked remaining time period or a state as to whether a call can be made from a user whose portable terminal is set in a call blocking function such that the portable terminal user can determine a time point to make a call with the user whose portable terminal is currently blocked. Therefore, the portable terminal user can make a call with the portable terminal at a proper call time. In addition, the method can allow the portable terminal user to receive state information regarding a user whose portable terminal is set in a call blocking function and then determine a call connectable time. In particular, the portable terminal user can make a call with a user whose portable terminal is set in a call blocking function if the portable terminal user has an emergency situation.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for connecting and blocking a call in a portable terminal, comprising:
   in response to setting a call blocking time period:
      measuring an elapsed time period from a time point,
      determining whether the elapsed time period exceeds the set call blocking time period when the portable terminal receives a request for a call connection from an external terminal, and
      blocking the call connection and transmitting a remaining time period to the external terminal requesting the call connection if the elapsed time period does not exceed the set call blocking time period, the remaining time period calculated by subtracting the elapsed time period from the set call blocking time period; and
   transmitting a release message to the external terminal requesting the call connection if the elapsed time period exceeds the set call blocking time period, the release message indicating that a call connection with the portable terminal will be allowed.

2. The method of claim 1, further comprising:
   in response to setting a call blocking release time:
      determining whether a current time is after the call blocking release time when the portable terminal receives a request for a call connection from an external terminal, and
      blocking the call connection and transmitting the call blocking release time to the external terminal if the current time is not after the call blocking release time.

3. The method of claim 2, further comprising:
   allowing the call connection with the external terminal if the current time is after the call blocking release time.

4. The method of claim 1, wherein setting the call blocking time period comprises selecting one from a set of predetermined time periods.

5. The method of claim of claim 1, wherein setting the call blocking time period comprises allowing a user to directly enter a user-specified time period.

6. A method for connecting and blocking a call in a portable terminal, comprising:
   setting a call connection blocking mode to one of an execution mode and a release mode;
   blocking a call connection when receiving a request for the call connection from an external terminal if the call connection blocking mode of the portable terminal is set to the execution mode;
   and
   in response to receiving a command for switching the call connection blocking mode from the execution mode to the release mode from an input unit of the portable terminal:
      setting the call connection blocking mode to the release mode, and transmitting a release message to the external terminal requesting the call connection, the release message indicating that a call connection with the portable terminal will be allowed.

7. The method of claim 6, further comprising allowing a call connection with the external terminal if the call connection blocking mode is set to the release mode.

8. The method of claim 6, further comprising:
setting a user state information regarding the portable terminal.

9. The method of claim 8, further comprising transmitting a message to the external terminal, the message asking the external terminal to select whether to proceed with a call connection with the portable terminal if the call connection blocking mode of the portable terminal is set to the execution mode, and
wherein the message further comprises:
the set user state information.

10. The method of claim 9, wherein setting the user state information comprises selecting from a list comprising meeting, driving, and sleeping.

11. The method of claim 9, wherein setting the user state information comprises accepting user-specified input.

12. The method of claim 6, further comprising measuring an elapsed duration, the elapsed duration measured from the time at which the message is transmitted to the external terminal.

13. The method of claim 12, further comprising:
determining whether the elapsed duration exceeds a predetermined time period when a request for a subsequent call connection is received from the external terminal; and
performing the subsequent call connection with the external terminal in response to determining that the elapsed duration is not greater than the predetermined time period.

14. The method of claim 13, further comprising transmitting the message to the external terminal in response to determining that the elapsed duration is greater than the predetermined time period, the message asking the external terminal to select whether to proceed with a call connection with the portable terminal.

\* \* \* \* \*